United States Patent [19]
Volpe et al.

[11] Patent Number: 5,945,022
[45] Date of Patent: Aug. 31, 1999

[54] CONTINUOUS MICROWAVE ASSISTED BAKING PROCESS

[75] Inventors: Theresa Volpe, Kinnelon; Laura A. Gallagan; Lynn Haynes, both of Morris Plains; Mihaelos N. Mihalos, Palisades Park, all of N.J.; Lawrence Scher, Bronx, N.Y.; Henry Clark; Peter Daines, both of Peterborough, United Kingdom; Chris Wiggins, Lincs, United Kingdom; John Zabrodsky, Jamestown, N.Y.; Martin R. Shute, Lincolnshire, United Kingdom

[73] Assignees: Nabisco Technology Company, Wilmington, Del.; APV Baker Ltd., Peterborough, United Kingdom

[21] Appl. No.: 08/928,493

[22] Filed: Sep. 12, 1997

[51] Int. Cl.$^6$ ........................................ H05B 6/50
[52] U.S. Cl. ............................................ 219/707; 426/241
[58] Field of Search .................... 219/707; 426/241–243, 426/496, 523

[56] References Cited

U.S. PATENT DOCUMENTS

| | | |
|---|---|---|
| Re. 33,374 | 10/1990 | Bhattacharjee . |
| 3,630,755 | 12/1971 | Schiffmann et al. . |
| 3,699,899 | 10/1972 | Schiffmann et al. . |
| 3,935,330 | 1/1976 | Smith et al. . |
| 4,350,713 | 9/1982 | Dyson et al. . |
| 4,390,767 | 6/1983 | Bucksbaum et al. . |
| 4,434,342 | 2/1984 | Schubring . |
| 4,930,489 | 6/1990 | McFadden . |
| 4,931,303 | 6/1990 | Holm et al. . |
| 4,994,295 | 2/1991 | Holm et al. . |
| 5,080,087 | 1/1992 | McFadden et al. . |
| 5,094,865 | 3/1992 | Levinson . |
| 5,188,859 | 2/1993 | Lodge et al. . |
| 5,290,575 | 3/1994 | Torikata . |
| 5,334,402 | 8/1994 | Ovadia . |
| 5,339,892 | 8/1994 | Clifton . |
| 5,369,250 | 11/1994 | Meredith . |
| 5,457,303 | 10/1995 | Shute et al. . |
| 5,478,986 | 12/1995 | Westerberg . |
| 5,522,462 | 6/1996 | Kumar et al. . |

FOREIGN PATENT DOCUMENTS

| | | |
|---|---|---|
| 1409227 | 10/1975 | United Kingdom . |
| 1471016 | 4/1977 | United Kingdom . |
| WO 94/26078 | 11/1994 | WIPO . |

OTHER PUBLICATIONS

Webster's New International Dictionary, G. & C. Merriam Company, 2nd ed. Unabridged, p. 2450 (1951).
Matz, *Cookie and Cracker Technology*, The AVI Publishing Company, Inc., Westport, Conn., pp. 254–267 (1968).
J. R. Stamper, "Continuous Production Using Microwaves—Part 2", BCCA, United Kingdom Conference, Feb. 1993.
APV Enquiry 104, "New Multi Media Laboratory Oven For Food Process Centre," published prior to Sep. 1997.
Decareau, "Microwaves and Food," FNP Newsletter, vol. 6 No. 8, Aug. 1996.

*Primary Examiner*—Teresa Walberg
*Assistant Examiner*—Jeffrey Pwu

[57] ABSTRACT

The stack height and moisture content of baked goods produced continuously in a multi-zone oven, such as a gas-fired band oven, is controlled and adjusted using microwave energy. Color development, flavor development, texture, and appearance of the baked products are not adversely affected by the replacement of a substantial amount of the non-microwave energy input with microwave energy. The stack height and moisture content of the baked product may be controlled or adjusted with the microwave energy to be within predetermined ranges or specifications independently of each other. Upon detection of product which is not within specifications, the microwave energy may be used to rapidly adjust stack height and/or moisture content so that they quickly return to their predetermined acceptable levels thereby substantially reducing product waste or recycling. The stack height of the baked pieces is controlled and adjusted using microwave energy early in the baking process. Moisture content control and adjustment using microwave energy may accompany and follow the stack height control. The moisture content control and adjustment is a function of the total microwave energy input into all zones. Color development may be performed using non-microwave energy downstream of the microwave energy input for stack height and moisture control.

32 Claims, No Drawings

CONTINUOUS MICROWAVE ASSISTED BAKING PROCESS

FIELD OF THE INVENTION

The present invention provides a method for controlling stack height and moisture content of baked goods produced continuously on a mass-production basis using microwave assisted baking.

BACKGROUND OF THE INVENTION

In the mass production of baked goods such as crackers, cookies and snacks using a continuous baking process, dough pieces are subjected to heating in a plurality of temperature zones to leaven the dough pieces, reduce their moisture content, and develop flavor, color, shape, and textural attributes such as crispness, crunchiness, and tenderness. The final moisture content of the product exiting the oven affects its shelf-life and texture. The baking process should provide a consistent moisture content to assure shelf stability and a desirable texture.

However, in gas-fired continuous baking ovens variation in heating generally occurs across the width of the oven band, which may be up to about five feet in width. Lower and higher temperatures can be established at various points on the oven band due to variable conditions primarily related to corrective air flow patterns and radiative effects. Changes in ambient air temperature, gas pressure, dough weights, and dough moisture content from batch to batch may also result in excessive variations in baked product moisture content in pieces across the band as well as along its length, which may be up to about 300 feet. Non-uniform distribution of heat may occur along the length of the oven, with the development of hot zones on the band adjacent each burner and cooler spots midway between adjacent burners. Baked products with moisture contents out of a specified range are either discarded or recycled, thereby resulting in loss of efficiency and increased costs.

The variations in heating across the width of the oven band and along its length can also lead to undesirable, substantial variations in the amount of leavening or oven rise from piece to piece. Baked piece height variation, if excessive, adversely affects the attainment of a consistent stack height. In packaging systems, such as for slug-type packaging, where baked pieces are packaged or stacked face-to-face if the stack height for a given number of pieces is too low, an extra piece needs to be added to the stack, thereby resulting in increased weight and production costs. Inversely, if the stack height for a given number of baked pieces is too high, the slug or even a dump-fill bag may not contain a sufficient number of pieces to meet the package label weight requirement.

Upon detection of baked product moisture contents and stack heights which do not meet specifications, heat inputs into one or more zones of a gas fired oven may be adjusted along with exhaust extraction rate to control chamber humidity to bring the baked product back into specifications. However, the adjustment time or response time to bring the moisture content or stack height back into specifications generally takes at least about an hour. Since the oven is a continuous oven, the longer it takes to make the adjustment, the more product produced out of specifications and the greater the amount of out-of-specification product. The prolonged adjustment time is generally due to the time needed for manual adjustment of the gas burners, and for the massive ovens to cool down or heat up and reach a steady state. Additionally, variations across the oven band width generally can not be readily, substantially reduced. Furthermore, gas burner flow rate adjustments to change the moisture content may adversely affect stack height, and vice versa.

As disclosed in U.S. Pat. No. 5,369,250 to Meredith, microwave heating ovens are well-known for the rapid volumetric heating of food. However, a common problem encountered with the microwave heating is the lack of uniformity of heating particularly on the edges and corners of solids. A microwave heating device having a microwave emission slot is used to achieve substantially uniform heat distribution, and for controlling the rate of rise of temperature in an article without unnecessary energy loss between articles in a train of articles.

The rapid heating provided by microwaves has been used to reduce baking times in the production of bread as disclosed in U.S. Pat. No. 5,290,575 to Torikata and U.S. Pat. No. 5,334,402 to Ovadia. or increase oven throughput. Additional heating means, it is disclosed are needed to obtain browning of the bread.

Continuous mixing of cake-making components to form a gas-infused batter, and thereafter expanding and cooking the batter under the application of microwave energy to form a baked sponge cake is disclosed in U.S. Pat. No. 4,350,713 to Dyson et al. The continuous process, it is disclosed does not require a long leavening time.

U.S. Pat. Nos. 3,630,755 and 3,699,899 each to Schiffmann et al discloses the use of microwave energy to reduce proofing time in the production of yeast-raised bakery products such as yeast-raised doughnuts. The dough pieces are subjected to at least two microwave heating periods separated by a "rest" period. The initial microwave heating of the dough rapidly raises its temperature to a level at which appreciable gassing of the yeast can take place. During the second interval, when the microwave power is turned off, the dough is maintained at a temperature at which relatively fast gassing can take place. During this "rest" interval, the temperature of the dough equilibrates. A widely varying temperature within any dough piece, it is disclosed, would give rise to a non-uniform density of the finished product. The different parts of the dough piece would expand to different extents during the subsequent heating of the dough piece in the last phase of the proofing process and during frying. During the second microwave interval, the dough temperature rises rapidly to the final proofing temperature. After complete proofing, frying or baking can begin immediately.

U.S. Pat. No. 5,457,303 and International Patent Publication No. WO94/26078 (published Nov.10, 1994) each to Shute et al disclose a combined oven where microwave energy is injected into an oven at various positions along the oven length. The microwave heating, it is disclosed, provides means to induce a rapid transfer of energy to the product, the level of energy transfer being selected to provide a desired effect within the product. In a proposed combined microwave-biscuit oven having four microwave zones, the first microwave zone induces a rapid rise in temperature within the product, the second microwave zone enhances development, and the third and fourth microwave zones reduce the moisture content of the product prior to leaving the oven. Adjusting stack height and moisture content to within product specifications using the microwave energy is not disclosed.

United Kingdom patent publication no. 1,409,227 (published Oct. 8, 1975) discloses the production of bread using a microwave preheating and proofing chamber for partially proofing unproofed dough product. A conventional proofing chamber receives the dough from the preheating chamber for completely proofing the dough. A microwave dough cooking chamber is used to cook the proofed product. A conventionally heated browning zone is used for browning the bread after it has been cooked. Measuring stack height or moisture content of the baked products and adjusting the microwave energy input to control stack height or moisture content is not disclosed.

United Kingdom patent publication no. 1,471,016 (published Apr. 21, 1977) discloses a bakers' oven for baking biscuits in which the dough is passed through at least three separate baking stages, where ambient heat and optionally radiant heat is applied in a first heating section to build the products substantially to a desired thickness and internal structure. An intermediate section having means for subsequently applying high frequency dielectric heating is used for rapidly reducing the moisture content of the products to a substantially constant level for all of the products. A third heating section having means for then applying further ambient heat is employed to impart the desired color and texture to the products. A sensor for detecting the product thickness is provided in the first section and heating adjustments are made therein. A sensor for detecting infra-red radiation or product color is provided in the third section, and radiant energy adjustments may be performed if the dielectric energy fails. Measuring stack height or moisture content of the baked products and adjusting the microwave energy input to control stack height or moisture content is not disclosed.

In a paper presented at a BCCA, United Kingdom Conference in February 1993, "Continuous Production Using Microwaves—Part 2, J. R. Stamper it is disclosed that the use of microwaves in a conventionally heated traveling oven substantially reduces baking times and increases average stack height. However, it is reported that the samples of the biscuits produced in each of the tests were overall poor examples of biscuits. Also, the use of microwaves to adjust stack height so that it is substantially uniform is not disclosed.

It has found that excessive application of microwave energy to remove moisture from a dough and leaven it or to reduce baking time can excessively case-harden the dough and prevent sufficient moisture removal for a shelf-stable product. Discoloration, burning, scorching, and undesirable blistering of the product can result from excessive case-hardening. In addition, in microwaving sheeted doughs, if the dough thickness or height is too low, the microwave energy absorbing ability of the dough may be too low for effective moisture reduction and leavening by microwave treatment.

The present invention provides stack height and moisture content control using microwave energy in the continuous, mass production of baked goods, such as those produced from a dough sheet, without adversely affecting product attributes such as color, texture, shelf stability, weight, and topography. Stack height and product moisture content may be controlled independently of each other. Excessive case hardening which results in product scorching or burning or undesirable blistering are avoided in the processes of the present invention. The response time needed to bring the baked product back into predetermined ranges or specifications for moisture content and stack height is substantially reduced thereby reducing product which is out-of-specifications and reducing recycling. In addition, substantial reductions in gas input into the gas-fired baking ovens may be obtained while achieving substantially evenly leavened products and sufficient moisture reduction to obtain a shelf-stable baked product. The methods may be used for the production of baked goods such as crackers, cookies, sweet and savory snacks The baked goods may be full-fatted, reduced fat, low- fat or no-fat products.

SUMMARY OF THE INVENTION

The stack height and moisture content of baked goods which are baked in a continuous multi-zone gas fired baking oven are controlled by passing a plurality of at least partially cut dough pieces on an oven band through an oven comprising a plurality of separately controllable temperature zones, and subjecting them to microwave energy within at least one of the zones. In embodiments of the invention, the microwave energy is applied only within about the first 35% of the baking process, baking time, or baking length of the oven for adjustment and control of the stack height. The microwave energy applied in the one or more zones is sufficient to substantially reduce the moisture content of the at least partially cut dough pieces to case harden or set the structure of the pieces without scorching or burning. The moisture content reduction provides a moisture content which is substantially even across the width of the oven band so that the dough pieces leaven substantially evenly across the band. The coefficient of variation in moisture content of the baked pieces may be less than about 15%, preferably less than about 10%, most preferably less than about 5%. The stack height coefficient of variation may be less than about 4%, preferably less than about 2.5%, most preferably less than about 2%. In addition, the substantially even removal of moisture from the dough pieces helps to reduce "checking" or breakage of the baked products. In embodiments of the invention, the leavening may be essentially or completely accomplished in the temperature zone or zones in which the microwave energy is applied.

The dough pieces may be subjected to gas-fired convection heating in the same zone and at the same time they are being subjected to the microwave energy. After being subjected to the microwave heating, the microwaved dough pieces are heated within at least one temperature zone of the oven to brown the pieces and obtain baked pieces.

The stack height of the baked pieces is adjustable and controllable by adjustment of the level of the microwave energy to obtain a desired, or predetermined stack height substantially consistently during continuous operation of the oven. The level of microwave energy applied to achieve leavening does not cause excessive case hardening or skin formation prior to release of substantial amounts of moisture or steam which are sufficient to substantially and evenly leaven the dough pieces. In embodiments where surface blistering is desirable, such as in a fabricated snack chip, microwave energy levels may be increased during leavening to promote a blistered chip-like appearance or surface bubbles rather than a substantially flat or unblistered appearance.

The stack height and the moisture content of the baked pieces leaving the oven may be measured manually or automatically. If the stack height is not within a predetermined range or within specifications, the microwave energy input to the zone used to control stack height may be adjusted to either increase or decrease the stack height so that it falls within the target range. Adjustment of the moisture content of the baked pieces may be performed by adjusting the total microwave energy input into all of the microwave equipped zones. The response time for ascertaining whether the adjustment in microwave energy level is sufficient is generally substantially equal to the residence time or baking time of the pieces in the oven, which is generally about 3 minutes to about 10 minutes.

In embodiments of the invention, the total microwave energy input may be adjusted to change the moisture content of the dough pieces without substantially changing the stack height of the baked pieces. The microwave energy input in an upstream zone may be used to control stack height of the baked pieces while the microwave energy input to a zone downstream may be used to adjust moisture content of the baked pieces without substantially affecting stack height of the baked pieces.

In accordance with the present invention, a multi-zone gas-fired oven may be equipped with a plurality of microwave applicators, all of which are used to control moisture content, but not all are used to control stack height. In embodiments of the invention, the energy output from one or more microwave applicators can be changed to adjust stack height which may also change moisture content. However, to keep the moisture content of the baked pieces from changing or going out of specifications, a compensating, opposite change may be made in the microwave energy output from at least one other microwave applicator. The other microwave applicator may be located at a downstream position in the oven where stack height is not substantially affected because the leavened structure has been previously set.

For a given oven throughput, gas flow rates or gas consumption in the gas-fired multi-zone oven may be reduced by about 5% to about 20%, preferably about 8% to about 15%, for example about 10% when the baking is assisted by the microwaves without adversely affecting product attributes such as moisture content, texture, and color. At gas reduction rates which are greater than about 25%, the moisture content tends to rise above desired levels for prolonged shelf stability, good color development, and a crisp texture. Alternatively, gas consumption rates may be kept the same and oven throughput may be increased up to about 25%, preferably from about 5% to about 20%.

The baked goods having a substantially consistent stack height and moisture content which may be obtained by the processes of the present invention include crackers, cookies, and sweet and savory snacks. Reduced fat, low-fat, no-fat, and full-fatted baked goods which may be slug-packed or dump-packed may be produced in accordance with the present invention.

DETAILED DESCRIPTION OF THE INVENTION

In the processes of the present invention, microwave energy is used to control and adjust the stack height and moisture content of baked goods which are baked continuously, at a substantially constant production rate, in a multi-zone continuous oven. Color development, flavor development, texture, and appearance of the baked products are not adversely affected by the replacement of a substantial amount of the non-microwave energy input with microwave energy. The stack height may be controlled or adjusted with the microwave energy to be within a predetermined range or specifications independently of or without substantially affecting baked good moisture content. Likewise, baked good moisture content may be controlled or adjusted with the microwave energy to be within a predetermined range or specification independently of or without substantially affecting stack height. Thus, when the continuous baking operation and the energy input of the non-microwave energy source have reached steady-state, stack height and moisture content may be adjusted to be within specifications by adjusting only the microwave energy input. Substantial adjustments, if any, in the energy input of the non-microwave energy source, such as natural gas, generally are not required to bring a product into specifications in the present invention. Upon detection of product which is not within specifications, the microwave energy may be used to rapidly adjust stack height and/or moisture content so that they quickly return to their predetermined acceptable levels thereby substantially reducing out-of-specification product or recycling.

In accordance with the present invention, a plurality of dough pieces, partially cut or completely cut from a dough sheet are continuously passed on an oven band through an oven comprising a plurality of temperature zones, and are subjected to microwave energy within at least one zone. The microwave energy substantially reduces the moisture content of the pieces so that the moisture content of the pieces is substantially even across the oven band so that they leaven substantially evenly across the band. If the moisture content of the pieces across the oven band differs prior to microwaving, the pieces with the higher moisture contents absorb more microwave energy because of the better coupling or better microwave absorption. Thus, the pieces with the higher moisture contents before microwaving tend to lose more moisture during microwaving thereby tending to equalize dough piece moisture content across the oven band. Substantially evenly microwaving of dough pieces with a substantially uniform moisture content across the band reduces the moisture content of the pieces substantially evenly across the oven band so that they leaven substantially evenly.

For independent control and adjustment of stack height and moisture content, at least two microwave applicators are used, preferably in different temperature zones. In accordance with embodiments of the invention, all zones may contain both a non-microwave energy source, such as gas-fired burners, and one or more microwave applicators. However, it has been found that microwave applicators generally are not required in each zone of the oven for the consistent control of stack height and moisture content. For example, a multi-zone continuous oven having at least five temperature zones may contain microwave applicators in only two zones. In preferred embodiments, a seven zone continuous oven may have microwave applicators in only three zones. In certain stages of the baking process, microwave energy is not efficiently absorbed by the dough pieces or it has little effect upon stack height and moisture content. For example, near the entrance to the oven, dough pieces may be too thin to efficiently absorb microwave energy and it would be more effective to increase the dough piece height with gas heat and then adjust the height with the microwave energy while the surface of the dough is still flexible. Also, towards the end of the oven where the height has been set, the moisture content is relatively low, and color development is desired, it is generally more effective to use gas heat for moisture removal and color development.

During baking, as the moisture and leavening gases are released, the dielectric properties and microwave energy absorbing ability of the dough piece change due to a change in moisture content, chemical composition, density, and geometry of the dough piece. In embodiments of the present invention, for controlling stack height and moisture content, the microwave energy may be applied when the dough piece still possesses substantial or maximal dielectric properties or microwave energy absorption ability. For example, to control stack height, it is preferable to heat the dough piece with non-microwave energy to permit it rise to a thickness which is amenable to microwave absorption, and to then subject it to microwaves to control the stack height. Sheeted dough heights or thicknesses of at least about 1/8 of an inch are preferred for effective coupling of the microwave energy with the dough piece. Also, to control moisture content, it is preferable to apply the microwave energy when the dough piece height has reached a maximum value and before the dielectric properties or microwave energy absorption ability substantially decreases.

In embodiments of the present invention, the stack height of the baked pieces is controlled and adjusted using microwave energy early in the baking process. Moisture content control and adjustment using microwave energy may accompany and follow the stack height control. The moisture content control and adjustment is a function of the total microwave energy input into all zones. Color development may be performed using non-microwave energy downstream of the microwave energy input for stack height and moisture control. For example, stack height may be controlled or adjusted by microwaves primarily in the first temperature zone and continue into the second zone of a seven zone continuous gas-fired band oven. In embodiments of the invention, at least about 75% of the maximum dough piece height may be reached within the first temperature zone. The microwave energy also substantially reduces the moisture content of the dough pieces in the first and second zones as the dough pieces rise and leaven. The final product moisture content may be controlled and adjusted by microwaves in the first zone where stack height is primarily adjusted as well as in one or more downstream zones. The release of moisture and leavening gases in the first zone and second zone generally result in the attainment of a maximum dough piece height within the second zone. Downstream of the microwave energy input in the second zone, the maximum dough piece height may decrease as the force of the escaping gases decreases. The structure of the dough pieces may then begin to set so that by the time the dough pieces reach the fourth zone, the dough piece height remains substantially the same through the remainder of the oven. The application of microwave energy in the fourth zone may therefore be used to adjust moisture content of the dough pieces with little or essentially no effect upon stack height. Color development as well as moisture reduction may continue in zones downstream of the fourth zone microwave energy with: 1) non-microwave energy, and 2) the optional application of additional microwave energy.

In embodiments of the present invention, a multi-zone gas-fired oven may be equipped with a plurality of microwave applicators, all of which are used to control moisture content, but not all of which are used to control stack height. The energy output from one or more microwave applicators in at least one zone can be increased to upwardly adjust stack height which may also decrease moisture content. However, to keep the moisture content of the baked pieces from decreasing, a compensating decrease may be made in the microwave energy output from at least one other microwave applicator which is located at a downstream position in the oven where stack height is not substantially affected because the leavened structure has set. Similarly, to downwardly adjust stack height, the energy output from one or more microwave applicators in at least one zone can be decreased which may also increase moisture content. A compensating increase may be made in the microwave energy output from at least one other microwave applicator which is located at a downstream position in the oven where stack height is not substantially affected to keep the moisture content from increasing.

To adjust moisture content of the baked pieces, without substantially affecting stack height, the total microwave energy input to the temperature zones may be adjusted by increasing or decreasing the microwave energy input into one or more zones which are downstream of the microwave applicator or applicators used to primarily adjust stack height.

In accordance with the present invention, application of microwave energy for control of stack height and moisture content may be only within about the first 60% of the baking process, time, or length of the oven. For stack height control, the application of microwave energy may be only within about the first 35% of the baking process, time, or length of the oven. For example, microwave energy may be applied at locations which are: a) from about 5% to about 15% of the baking process, time, or length of the oven for stack height and moisture control, b) from about 20% to about 30% of the baking process, time, or length of the oven for stack height and moisture control, and c) from about 45% to about 55% of the baking process, time, or length of the oven for moisture control, as measured from the start of baking or the entrance to the oven. Thus for a 100 foot long oven, the microwave energy applied at location "a" would be at a distance extending from about 5 feet (5% of 100 feet) from the entrance of the oven to about 15 feet (15% of 100 feet) from the entrance of the oven. Generally, only from about 5% to about 25%, preferably from about 7% to about 15% of the total length of the oven is subjected to microwave energy. Likewise, for a baking process or baking time of four minutes, the microwave energy applied at time "a" would be at about 12 seconds (5% of 4 minutes) to about 36 seconds (15% of 4 minutes) into the baking process or baking time.

The amount of microwave energy input may be from about 5% to about 25%, preferably from about 10% to about 20% of the total energy input, which includes microwave energy and non-microwave energy such as natural gas. In embodiments of the invention, the non-microwave energy source may be reduced or the oven throughput or amount of baked goods produced, can be increased as a result of the use of microwave energy. For example, for a given throughput, flow rates or gas consumption in a gas-fired multi-zone oven may be reduced by about 5% to about 20%, preferably about 8% to 15%, for example about 10% when the baking is assisted by the microwaves without adversely affecting product attributes such as moisture content, texture, and color. Reducing the gas consumption greater than about 25%, while keeping the total energy input and production rate the same tends to increase product moisture content above desired levels for prolonged shelf stability, good color development, and a crisp texture. Use of the microwave energy as a partial replacement for the non-microwave energy input in accordance with the present invention avoids the need to change the dough formulation or composition, such as the level of leavening agents, to adjust stack height.

In embodiments of the present invention, in each zone where microwave energy is supplied, from one to three applicators may be used in separate sections of the zone, and the maximum power level which may be delivered may be about 20 kW per applicator. The number of microwave applicators used in each zone may be the same or different. Generally, it is preferable to have about three applicators in the first zone for flexibility in stack height and moisture content control and to accommodate different products within the same oven. Downstream zones, such as zones two and four may generally contain two applicators. The applicators in each zone may be spaced adjacent one another or apart. The spacing may, for example, be approximately equal to one to two lengths of an applicator.

For a throughput of from about 1500 lbs to about 6000 lbs of product per hour, the total amount of power used in each zone generally ranges from about 5 kW to about 40 kW. The total microwave energy input for all zones generally ranges from about 30 kW to about 90 kW.

For compositions which contain particulate ingredients which are highly susceptible to microwave absorption, such as chocolate chips or other flavor chips, microwave energy levels used to reduce or adjust moisture content may be adjusted downwardly to avoid excessive melting of the flavor chips. Thus, the total microwave energy input may be adjusted to change the moisture content of the dough pieces without causing substantial bleeding of the flavor chips on the surface of cookies.

The level of microwave energy applied to achieve leavening should not be so high that it causes excessive case hardening or skin formation which would prevent sufficient release of moisture for the attainment of a shelf-stable product. In embodiments where an at least substantially flat, unblistered surface is desired, microwave energy input levels may be adjusted to provide skin formation or case hardening which permits release of substantial amounts of moisture or steam which are sufficient to substantially and evenly leaven the dough pieces. In embodiments where surface blistering is desirable, such as in a fabricated snack chip, microwave energy levels may be increased during leavening, preferably in the first and/or second zone, to promote a blistered chip-like appearance or surface bubbles rather than a substantially flat or unblistered appearance.

In accordance with the present invention, the moisture content reduction which is achieved with the microwave applicators is substantially even for a plurality of dough pieces arranged substantially equally spaced across the width of the oven band so that the dough pieces leaven substantially evenly across the band. The coefficient of variation in moisture content across the band and for the baked pieces exiting the oven may be less than about 15%, preferably less than about 10%, most preferably less than about 5%. The coefficient of variation, or $C_V$ may be defined as the standard deviation as a percentage of the mean, or:

$$C_V = (\text{standard deviation})/\text{mean} \times 100\%.$$

The stack height coefficient of variation may be less than about 4%, preferably less than about 2.5%, most preferably less than about 2%. In addition, the substantially even removal of moisture from the dough pieces helps to reduce "checking" or breakage of the baked products.

The amount of moisture reduction by the microwave energy input may be from about 5% to about 25%, preferably from about 10% to about 20% of the total moisture removed in the oven during the baking process. For example, a dough entering the oven with a moisture content of about 30% by weight, based upon the weight of the dough, may have its moisture content reduced about 20% to obtain a moisture content of about 24% by weight, based upon the weight of the dough.

In accordance with the methods of the present invention, the moisture content of the baked pieces exiting the oven may be periodically measured. Then, if a measurement indicates that the moisture content is not within a predetermined range, the total microwave energy input into the oven may be adjusted by adjusting the microwave energy input into at least one microwave energy zone to substantially consistently obtain a predetermined moisture content in the baked pieces during continuous operation of the oven. The moisture content of the baked pieces may be measured automatically in-line using conventional moisture measurement techniques. Adjustment of the microwave energy input may be conducted automatically using conventional controls, based upon the automatic measurement of the moisture content of the baked pieces.

In addition, stack height of the baked pieces exiting the oven may be periodically measured, for example every 15 minutes. If the stack height is not within an acceptable predetermined range, the microwave energy input into one or more zones may be adjusted to substantially consistently obtain a predetermined stack height for the baked pieces during continuous operation of the oven. For example, the stack height of 35 crackers may be controlled to be within a predetermined range of about 7.25 inches to 8.0 inches, with a coefficient of variation of about 2.2% as measured about every 15 minutes during period of operation of about 2 weeks. The stack height may be measured manually, or ay be measured automatically in-line using conventional vision technology. Adjustment of the microwave energy input may be conducted automatically using conventional controls, based upon the automatic measurement of the stack height of the baked pieces.

The response time for ascertaining whether the adjustment in microwave energy level is sufficient is generally substantially equal to the residence time or baking time of the pieces in the oven, which is generally about 3 minutes to about 10 minutes. This response time is extremely rapid compared to the generally one to three hour response time needed to adjust moisture content and stack height in a commercial scale all gas-fired multi-zone band oven.

The use of microwave energy to control and adjust stack height and moisture content in accordance with the methods of the present invention may be practiced in various types of continuous, multi-zone ovens which are retrofitted with microwave applicators or which are commercially available. Exemplary of continuous, multi-zone ovens which may be equipped with microwave applicators for use in the present invention are: 1) direct gas-fired continuous multi-zone ovens, 2) air impingement or hot-air bake continuous multi-zone ovens, 3) infra-red continuous multi-zone ovens, 4) indirect heated continuous multi-zone ovens where an external burner heats air which is then forced into the oven chamber, 5) hybrid, forced air convection, gas fired continuous multi-zone ovens, and 5) electric continuous multi-zone ovens. Direct gas-fired continuous, multi-zone ovens are preferred. Continuous microwave-assisted baking ovens are commercially available from APV Corporation, Ltd., London, England.

Microwave assisted baking ovens having microwave applicators such as disclosed in U.S. Pat. No. 5,457,303 and International Pat. Publication No. WO94/26078 (published Nov. 10, 1994) each to Shute et al may be used in the methods of the present invention. The latter U.S. patent and International Pat. Publication are herein incorporated by reference in their entireties. As disclosed therein, the microwave assisted oven may comprise a tunnel oven casing having spaced apart oven tunnel sidewalls and an oven roof connecting the side-walls. An electrically conductive product-supporting conveyor band, such as a steel band or mesh, may be positioned between the side-walls and beneath the roof to extend lengthwise or longitudinally through the tunnel, and extends beyond both ends of the baking chamber. A band drive means drives the band which conveys the dough pieces in a continuous stream through the tunnel or baking chamber. The speed of the conveyor is regulated so that the goods being baked remain within the baking chamber or tunnel for the proper baking time, and the baked goods are continuously discharged from the outlet end of the conveyor.

A plurality of microwave applicators are positioned between the side-walls and above the oven band for directing microwaves uniformly to the product. A microwave supply means connects a microwave generator or magnetron to the microwave applicator. A preferred microwave generator frequency is 2450±50 MHz.

The microwave applicator may comprise an elongate microwave emitter assembly extending transversely of the oven band, and microwave launch means extending longitudinally of the oven and above the band from adjacent to the emitter assembly. The emitter assembly may comprise a plurality of spaced-apart microwave emitter means for emitting radiation into the oven generally in a longitudinal direction of the oven with a plane of polarization of the electric field vector that is substantially perpendicular to the oven band. The microwave emitter assembly may comprise a feeder waveguide extending transversely of and over the oven band. The plurality of microwave emitter means preferably comprises a plurality of slots in a wall of the feeder waveguide. The slots may face in the longitudinal direction of the oven.

In an another embodiment, the plurality of microwave emitter means may be antenna associated with respective probes which extend inwardly of the waveguide from a wall of the waveguide. The antennas may depend downwardly from the feeder waveguide, and a plurality of probes located in the waveguide may each be directly connected to a respective antenna.

At least a portion of the launch means and the oven band define therebetween a microwave treatment space through which the dough pieces are conveyed for being subjected to microwave radiation. The launch means may be configured to maintain the polarization of the radiation in the treatment space substantially perpendicular to the oven band.

The microwave launch means may comprise, as viewed in longitudinal vertical section of the oven, a first stage positioned adjacent to the feeder waveguide, and a second stage which is remote from the feeder waveguide. The first stage may include upper and lower first stage plates disposed above and below respectively the slots, and extending generally longitudinally of the oven from the feeder waveguide. The second stage may comprise a panel extending closer to the oven band in proceeding away from the first stage, with the upper first stage plate meeting the second stage panel at a junction therebetween.

The upper and lower first stage plates, as viewed in longitudinal vertical section of the oven, may be essentially mirror images of each other about a longitudinal plane that extends symmetrically through the plurality of slots and parallel to the band. The plates may be flared apart proceeding in the longitudinal direction of the oven away from the feeder waveguide.

Each of the temperature zones of the continuous, gas-fired band ovens used in the methods of the present invention may include conventional band oven elongate gas burners. The gas burners may extend transversely across the conveyor at spaced intervals, each of these gas burners being provided with a row of apertures through which gas issues to form either a large number of individual flames lying close to one another, or a single continuous ribbon-like flame extending the full length of the row of apertures. Either form of flame will hereinafter be referred to as a "ribbon flame." The gas burners may be arranged in two rows, one row above and one row below the oven band or conveyor. The burners may be spaced at intervals of about one foot to about four feet. Each of the burners may produce a flat ribbon flame which extend the fall width of the oven band. The flames from the upper burners may be directed downwardly toward the oven band and down the forward direction of movement of the oven band. Similarly, the flames from the lower burners may be directed upwardly towards the oven band and down the forward direction of movement of the oven band. To provide the necessary gas and other connections to each burner, a removable plate may be provided in the side wall of the housing on the operating side of the oven. In addition to the gas supply, the removable plate may carry power connections to an electric igniter disposed adjacent each burner.

The gas burners may be mounted above and below the microwave applicators for simultaneously subjecting the dough pieces to both microwave energy and direct fired gas heat.

Crackers which may be produced in accordance with the present invention may be chemically leavened or unfermented full-fat, reduced fat, low-fat, or no-fat crackers. Fermented crackers, such as soda crackers or saltines, and the many variants of these products, such as oyster (soup) crackers, club crackers, cheese crackers, and the like, which are full-fatted or having reduced fat, low-fat or no added fat may also be produced in accordance with the present invention. Exemplary of other full-fat, reduced fat, low-fat, and no-fat baked goods which may be produced in accordance with the present invention include sweet goods such as cookies, and graham crackers, sweet and savory snacks, snack chips or fabricated chips, and the like. Exemplary cookies which may be produced are bar-type cookies, drop-type cookies such as chocolate chip cookies, oatmeal cookies, sugar cookies, fruit cookies, sandwich cookies, and the like.

While baking times and temperatures will vary for different dough or batter formulations, oven types, etc., in general, commercial cookie-, brownie- and cake-baking times may range from about 2 minutes to about 15 minutes, generally from about 3 minutes to about 8 minutes. Exemplary baking times for crackers, snacks, and snack chips may range from about 2.5 minutes to about 5 minutes. Baking temperatures for cookies, brownies, cakes, crackers, snacks, and snack chips may range from about 250° F. (121° C.) to about 650° F. (343° C.).

The baked products of the present invention have a relative vapor pressure ("water activity") of less than about 0.7, preferably less than about 0.6, most preferably from about 0.2 to about 0.3 to assure microbial shelf-stability. The shelf life of the baked goods produced in accordance with the present invention may be at least about two months, preferably at least about six months, most preferably at least about one year.

The water content of the cracker, snack, and fabricated chip products is generally less than about 6% by weight, for example, from about 0.25% by weight to about 4% by weight, based upon the weight of the baked product, exclusive of inclusions.

Cookie, brownie and cake products generally have a moisture content of less than about 20% by weight, for example, from about 2% by weight to about 9% by weight for cookies, based upon the weight of the baked product, exclusive of inclusions. In crisp variety cookies, the moisture content may be less than about 5% by weight, based upon the weight of the cookie. Soft cookies, cakes and brownies may have higher moisture contents. For example, the soft baked products may have moisture contents of about 5% to 10% by weight or more, based upon the weight of the baked good, inclusive of fillers and inclusions such as flavor chips, raisins and fruit pieces. For example, a fruit-filled, soft, moist cookie or cake may have a moisture content of about 15% by weight or more, based upon the total weight of the cookie.

Moisture contents may be determined by first grinding the cookies or other baked product and then using conventional moisture-analysis techniques on the ground sample. Exemplary of such techniques are Brabender (set at 145° C., for 12 minutes) analysis or vacuum-oven (set at 70° C. for 24 hours) analysis, with appropriate correlation.

The conventional or full-fatted baked goods and the reduced-fat, no-fat or low-fat products may exhibit a cookie crumb-like structure, appearance, texture and structural integrity.

Starch gelatinization (measured by differential scanning calorimetry) in the baked products of the present invention may generally be less than about 80% for crackers and snacks and less than about 10% for cookies.

The attainment of a consistent stack height in accordance with the present invention facilitates packaging and helps to reduce production costs. In packaging systems, which count the number of pieces such as for slug-type packaging, if the stack height for a given number of pieces is too low, extra pieces may need to be added to fill the slug, thereby resulting in increased production costs. Also, if the stack height for a given number of baked pieces is too high, the slug or even a dump-fill bag may not contain a sufficient number of pieces to meet the package label weight requirement. Controlling stack height to be substantially consistently within a predetermined range in accordance with the present invention avoids these packaging problems.

We claim:

1. A method for controlling the stack height of baked goods baked in a continuous multi-zone gas fired baking oven comprising continuously passing a plurality of at least partially cut dough pieces on an oven band through an oven comprising a plurality of temperature zones, said at least partially cut pieces being subjected to microwave energy within at least one zone of said oven to substantially reduce the moisture content of said pieces so that the moisture content of the pieces is substantially even across the oven band of said oven so that they leaven substantially evenly, and then subjecting the microwaved dough pieces to heating within at least one temperature zone of said oven to brown said pieces and obtain baked pieces, whereby the stack height of said baked pieces is adjustable and controllable by adjustment of the level of said microwave energy to obtain a desired substantially consistent stack height during continuous operation of said oven.

2. A method as claimed in claim 1 wherein said microwave energy is applied only within about the first 35% of the baking process, time, or length of said oven for said adjustment and control of the stack height, said oven comprising at least five temperature zones.

3. A method as claimed in claim 1 wherein gas-fired convection heating is applied to said pieces while they are being subjected to said microwave energy.

4. A method as claimed in claim 1 wherein said heating to brown said pieces is conducted in gas-fired temperature zones downstream from the zones in which the pieces are subjected to said microwave energy.

5. A method as claimed in claim 1 wherein said baked pieces are substantially flat for packaging in a slug package.

6. A method as claimed in claim 5 wherein said baked pieces are crackers.

7. A method as claimed in claim 1 wherein said baked pieces are graham crackers.

8. A method as claimed in claim 1 wherein the coefficient of variation of stack height of said baked pieces is less than about 2.5%.

9. A method as claimed in claim 1 wherein the amount of microwave energy applied in each zone is from about 5 kW to about 40 kW.

10. A method as claimed in claim 1 wherein said at least partially cut pieces are obtained by partially cutting a dough sheet.

11. A method for controlling the moisture content of baked goods baked in a continuous multi-zone baking oven comprising continuously passing a plurality of at least partially cut dough pieces on an oven band through an oven comprising a plurality of separately controllable temperature zones, said pieces being subjected to microwave energy within at least one microwave energy zone of said oven to substantially reduce the moisture content of said pieces, then subjecting the microwaved dough pieces to heating within at least one temperature zone of said oven to brown said pieces and obtain baked pieces, measuring the moisture content of said baked pieces, and adjusting the total microwave energy input within said at least one microwave energy zone to substantially consistently obtain a predetermined moisture content in said baked pieces during continuous operation of said oven.

12. A method as claimed in claim 11 wherein the total microwave energy input is adjusted to change the moisture content of said dough pieces without substantially changing the stack height of said baked pieces.

13. A method as claimed in claim 11 wherein the microwave energy input in an upstream zone is used to control stack height of said baked pieces, and the microwave energy input to a zone downstream of said upstream zone is used to adjust moisture content of said baked pieces without substantially affecting stack height of the baked pieces.

14. A method as claimed in claim 13 wherein the microwave energy is applied only in the first two zones of said oven, said oven comprising at least five temperature zones.

15. A method as claimed in claim 4 wherein gas-fired convection heating is applied to said pieces while they are being subjected to said microwave energy.

16. A method as claimed in claim 11 wherein the coefficient of variation of moisture content of said baked pieces is less than about 10%.

17. A method as claimed in claim 12 wherein the total amount of microwave energy input is from about 30 kW to about 90 kW.

18. A method as claimed in claim 11 wherein said baked goods are sweet goods.

19. A method as claimed in claim 18 wherein said sweet goods are crisp cookies.

20. A method for controlling the moisture content of baked goods baked in a continuous multi-zone gas fired baking oven comprising continuously passing a plurality of dough pieces on an oven band through a gas-fired oven comprising a plurality of gas fired temperature zones, said pieces being subjected to microwave energy within at least one zone of said oven to substantially reduce the moisture content of said pieces so that the moisture content of the pieces is substantially even across the oven band of said oven so that they leaven substantially evenly, and then subjecting the microwaved dough pieces to gas-fired convection heating in said oven to brown said pieces and obtain baked pieces, whereby the moisture content of said baked pieces is substantially consistent during continuous operation of said oven.

21. A method as claimed in claim 20 wherein said baked goods are cookies.

22. A method as claimed in claim 21 wherein the subjection of the dough pieces to microwave energy is in only two zones.

23. A method as claimed in claim 21 wherein the subjection of the dough pieces to microwave energy is in only three zones.

24. A method as claimed in claim 20 wherein said baked goods are no-fat graham crackers.

25. A method for controlling the moisture content of cookies baked in a continuous multi-zone gas fired baking oven comprising continuously passing a plurality of cookie dough pieces on an oven band through a gas-fired oven comprising a plurality of gas fired temperature zones, said cookie dough pieces being subjected to microwave energy within at least one zone of said oven to substantially reduce the moisture content of said cookie dough pieces, and then subjecting the microwaved cookie dough pieces to gas-fired convection heating to brown said pieces and obtain baked pieces, measuring the moisture content of said baked pieces, and adjusting the total microwave energy input within said at least one zone to substantially consistently obtain a predetermined moisture content in said pieces during continuous operation of said oven, the adjustment of the microwave energy input being conducted within a sufficiently short period of time so that the coefficient of variation of moisture content of said baked pieces is less than about 15%.

26. A method as claimed in claim 25 wherein the moisture content of said baked pieces is measured automatically in-line and said adjustment of the microwave energy input is conducted automatically based upon said automatic measurement of the moisture content of said baked pieces.

27. A method as claimed in claim 25 wherein said cookie dough pieces comprise flavor chips and the total microwave energy input is adjusted to change the moisture content of said pieces without causing substantial bleeding of said flavor chips on the surface of said cookies.

28. A method as claimed in claim 25 wherein said cookies are reduced fat, low fat, or no-fat cookies.

29. A method as claimed in claim 25 wherein the coefficient of variation of moisture content of said baked pieces is less than about 10%.

30. A method for controlling the stack height and moisture content of baked goods baked in a continuous multi-zone baking oven comprising:
   a) continuously passing a plurality of sheeted, at least partially cut dough pieces on an oven band through an oven comprising a plurality of separately controllable temperature zones, said pieces being subjected to microwave energy within at least one microwave energy zone of said oven to substantially reduce the moisture content of said pieces, then
   b) subjecting the microwaved dough pieces to heating within at least one temperature zone of said oven to brown said pieces and obtain baked pieces,
   c) measuring the stack height of said baked pieces and adjusting the microwave energy input based upon said measuring of stack height to substantially consistently obtain a predetermined moisture content in said baked pieces during continuous operation of said oven, the adjusting of the microwave energy input being in a temperature zone where the sheeted dough piece undergoes substantial leavening, and
   d) measuring the moisture content of said baked pieces, and adjusting the total microwave energy input based upon said measuring of moisture content to substantially consistently obtain a predetermined moisture content in said baked pieces during continuous operation of said oven, the adjusting of the microwave energy input being performed in a temperature zone where the dough piece height has reached a maximum value and before the dielectric properties or microwave energy absorption ability substantially decreases.

31. A method as claimed in claim 30 wherein microwave energy is applied at locations which are: a) from about 5% to about 15% of the baking process, time, or length of the oven for stack height and moisture control, b) from about 20% to about 30% of the baking process, time, or length of the oven for stack height and moisture control, and c) from about 45% to about 55% of the baking process, time, or length of the oven for moisture control, as measured from the start of baking or entrance to the oven.

32. A method as claimed in claim 30 wherein the microwave energy input in at least one zone is increased to upwardly adjust stack height and decrease moisture content, and the microwave energy input is decreased at a downstream position in the oven where stack height is not substantially affected so that the moisture content of the baked pieces remains substantially the same.

* * * * *